United States Patent [19]

McArthur

[11] 4,170,253
[45] Oct. 9, 1979

[54] BAKERY MIX DISPENSER HAVING PUMP ACTUATED OUTLET GATE

[76] Inventor: Donald A. McArthur, 4310 Arco, St. Louis, Mo. 63110

[21] Appl. No.: 678,026

[22] Filed: Apr. 19, 1976

[51] Int. Cl.² .............................................. B65B 3/04
[52] U.S. Cl. .................................. 141/362; 222/309; 222/334; 222/380; 222/383
[58] Field of Search ................................ 141/258-262, 141/360-362, 372; 222/491, 309, 334, 375, 380, 383, 249, 250; 91/341, 355; 417/399, 550

[56] References Cited

U.S. PATENT DOCUMENTS

| 1,039,336 | 9/1912 | Tyler | 417/550 |
| 1,654,673 | 1/1928 | Barks | 222/334 |
| 1,893,464 | 1/1933 | Barks | 222/334 X |
| 2,576,054 | 11/1951 | Vingerling | 222/383 X |
| 2,684,806 | 7/1954 | McBean | 222/309 X |
| 2,915,986 | 12/1959 | Sisson | 417/450 X |
| 3,601,987 | 8/1971 | Chermensky et al. | 222/334 |

FOREIGN PATENT DOCUMENTS 415927 11/1946 Italy ........................................ 417/550

Primary Examiner—David A. Scherbel
Attorney, Agent, or Firm—Cohn, Powell & Hind

[57] ABSTRACT

This dispensing device is for use with a mixing bowl having a discharge port. The device is connected to the bowl below the discharge port to receive mix from the bowl and includes a horizontal dispensing chamber having a discharge port at one end. A plunger mounted within the chamber includes a one-way valve passing the mix through the plunger head when the plunger moves away from the dispensing port and urging the mix out of the dispensing port when the plunger moves toward the dispensing port. The plunger is actuated by a piston and cylinder assembly which includes an adjustable stop predetermining the travel of the plunger and hence determining the quantity of mix dispensed.

8 Claims, 11 Drawing Figures

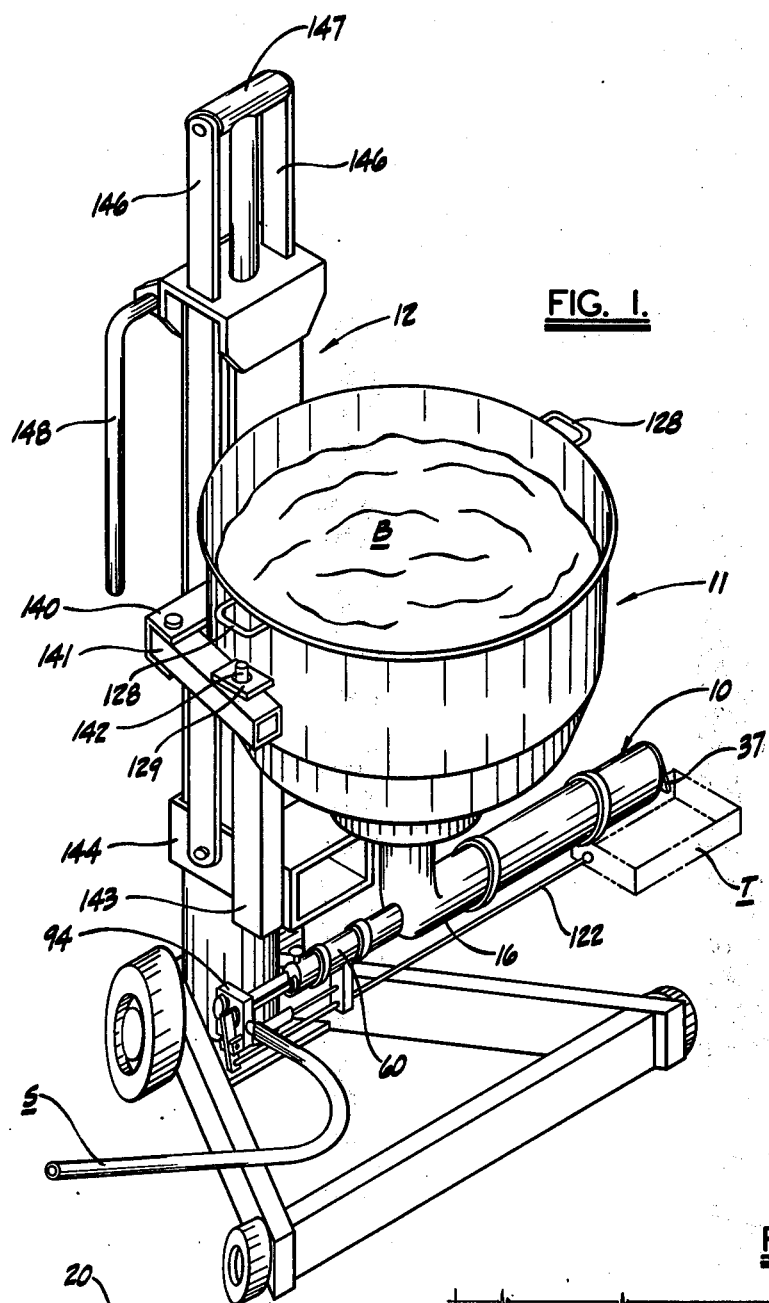
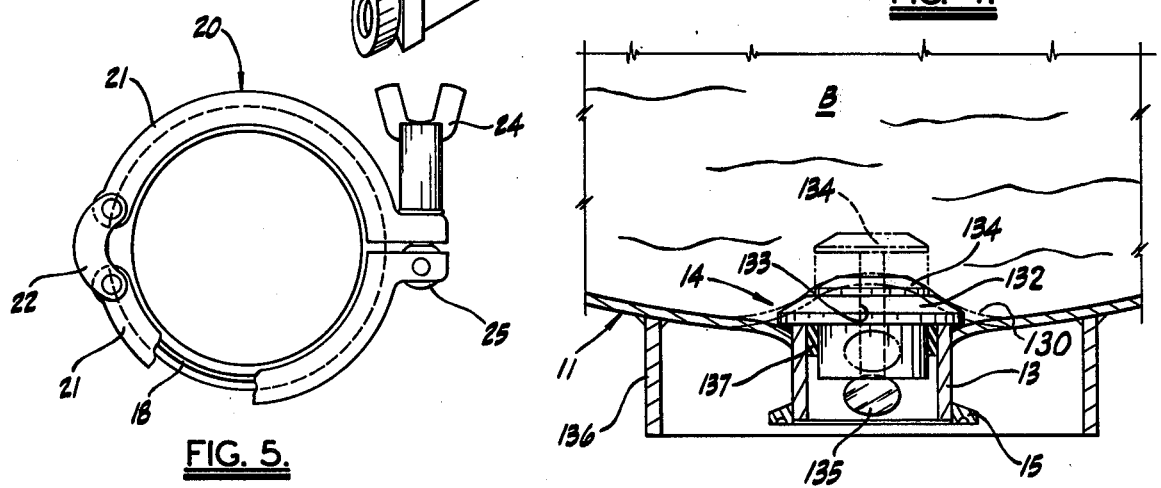

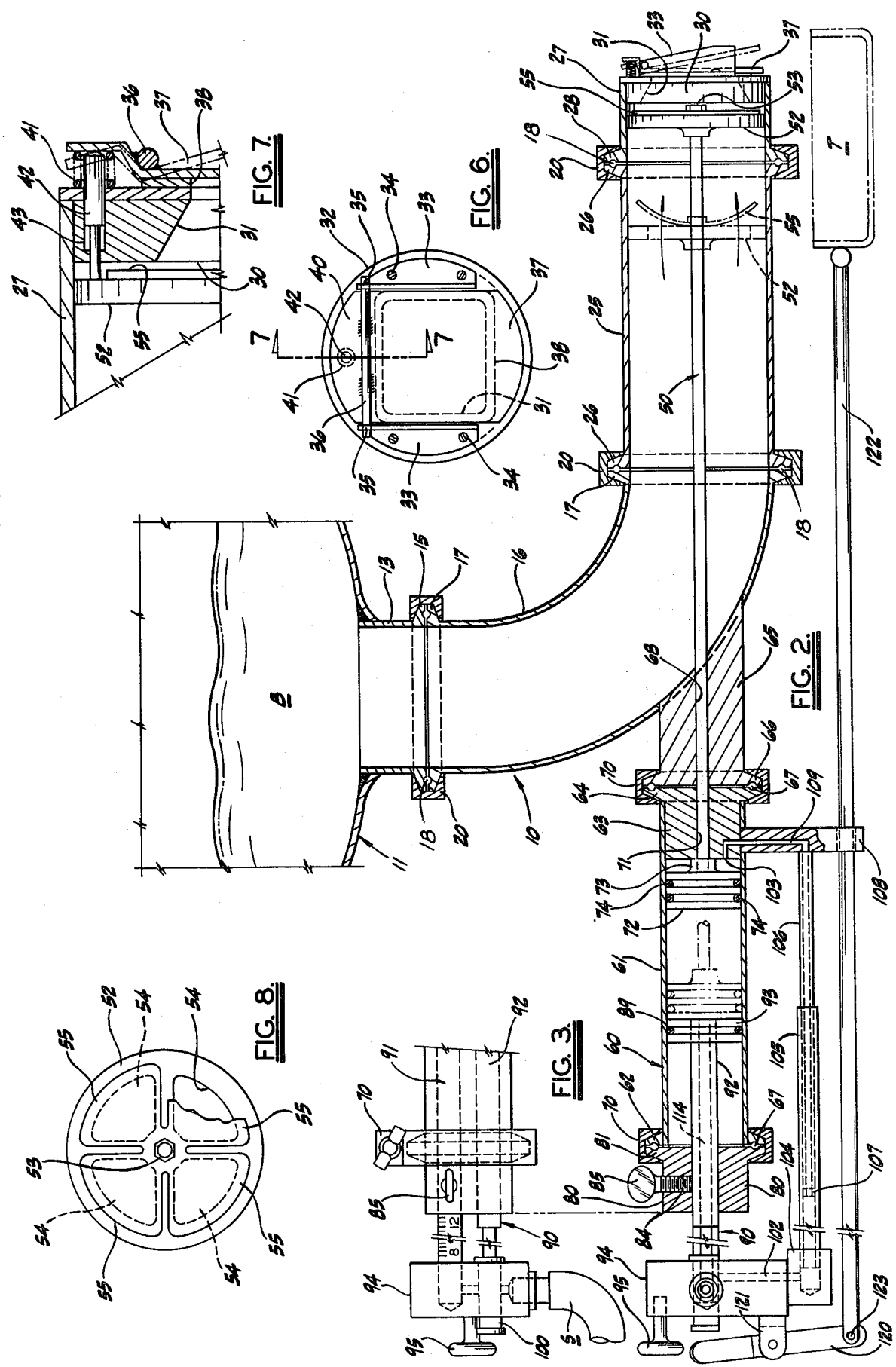

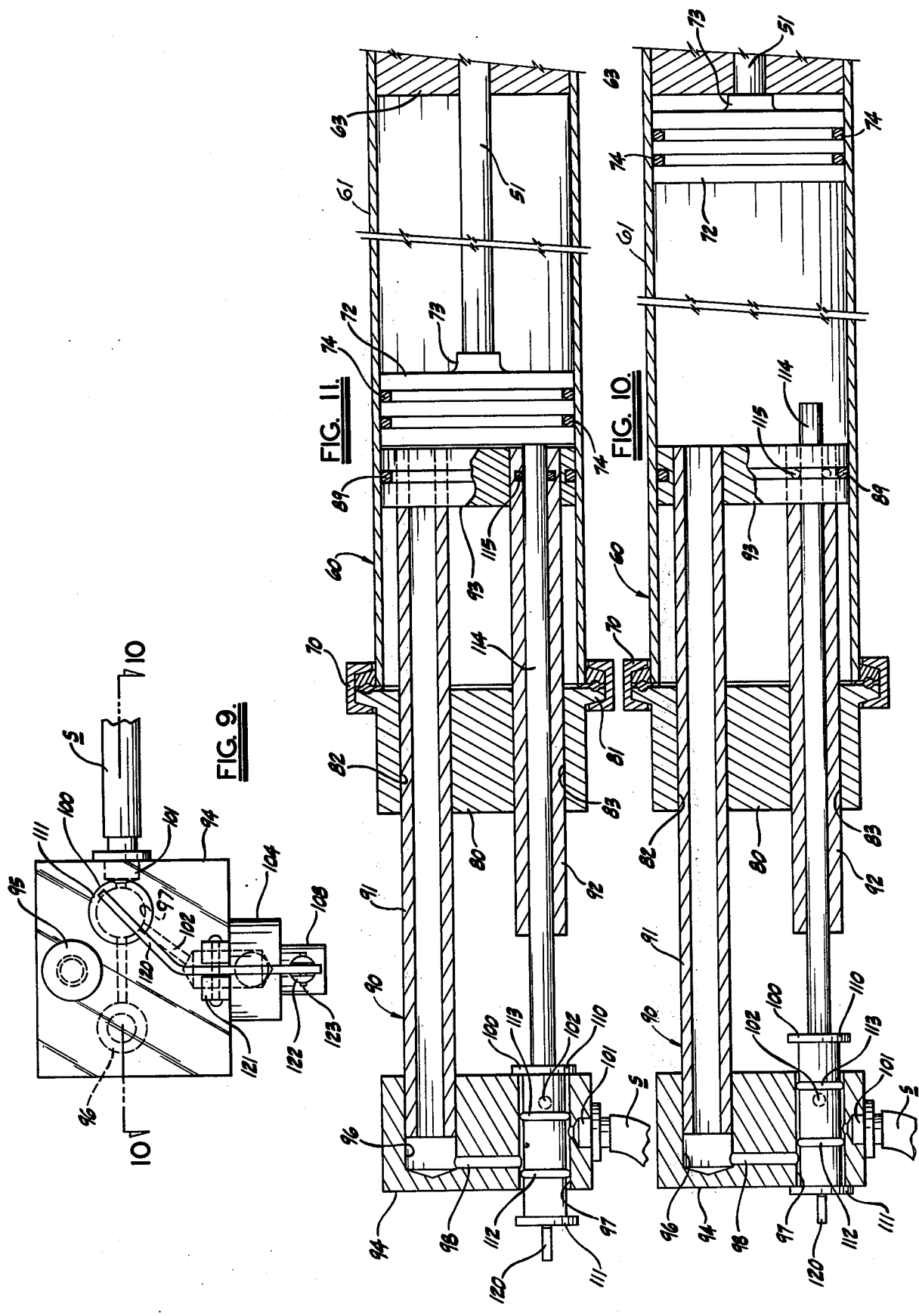

BAKERY MIX DISPENSER HAVING PUMP ACTUATED OUTLET GATE

BACKGROUND OF THE INVENTION

This invention relates generally to baking mix dispensers and particularly to a dispenser which is attached to the underside of a mixing bowl to receive mix directly from the bowl.

In commercial bakeries, baking mixes such as cake batters, are mixed in large mixing bowls by mixing machines having blades which are vertically retractable to permit convenient mixing at a relatively low elevation.

The conventional method of discharging the mix into cake tins preparatory to baking requires that the loaded bowls, which are sufficiently heavy to require two men to lift them, be raised to a considerable height and the contents tipped into hoppers which dispense metered quantities of the mix into cake tins held at about waist height. The disadvantage of this method is that there is no direct connection between the bowl and the hopper, the hopper is difficult to clean, and considerable energy must be expended to lift and tip the bowl to discharge the contents into the hopper.

Because of this, attempts have been made to develop dispensing pumps. One such pump is disposed within the mixing bowl and provides a vertical piston assembly connected to a vertical discharge pipe. A double check valve arrangement is utilized together with a secondary piston assembly to transfer the mix to a convenient elevation for dispensing purposes. The disadvantage of this type of device, apart from the initial expense, is that the length of discharge tubing required results in considerable cleaning difficulties. Moreover, there is a great deal of waste because the discharge tubing must be filled before dispensing can commence. A further, important disadvantage is that the relatively high pressures used tend to compress the mix and reduce the air entrainment, which is so necessary in a well balanced mix.

The present dispensing device solves the above problems in a manner not disclosed in the known prior art.

SUMMARY OF THE INVENTION

This dispensing device is mounted below the mixing bowl and receives the mix by gravity feed thereby eliminating the need for excessive pumping pressures.

The device utilizes relatively short lengths of dispensing tubing which are readily disassembled, thereby greatly facilitating the cleaning operation.

A dispensing chamber is connected to the mixing bowl and is provided with a plunger having an adjustable stroke which permits the quantity of mix dispensed from the dispensing port to be accurately gauged.

The plunger head is provided with a one-way valve which permits the mix to pass through the head when the plunger is moved away from the dispensing port and to be urged out of the dispensing port by the plunger when the plunger moves toward the dispensing port.

The plunger is actuated directly by a two-way piston and cylinder assembly connected to the plunger and an adjustable limit means within the cylinder provides a means of accurately gauging the travel of the plunger, and therefore of the quantity of mix dispensed.

Air is supplied to the piston assembly by a slide valve which routes air alternately behind and in front of the piston, said slide valve being actuated manually by an external switch for movement in one direction, and automatically by engagement of the piston with an internal switch for movement in the other direction.

BRIEF DESCRIPTION OF THE DRAWINGS

FIG. 1 is a perspective view of the dispensing device connected to a mixing bowl mounted on a jack;

FIG. 2 is a longitudinal cross sectional view of the dispensing device connected to the mixing bowl;

FIG. 3 is a fragmentary plan view of the actuating mechanism of the dispensing device;

FIG. 4 is a fragmentary cross sectional view illustrating the mixing bowl plug assembly;

FIG. 5 is a detail of a typical clamp connection;

FIG. 6 is an enlarged end view of the device illustrating the dispensing gate;

FIG. 7 is a fragmentary cross sectional view taken on line 7—7 of FIG. 6;

FIG. 8 is an enlarged detail of the dispensing plunger head;

FIG. 9 is an enlarged end view of the actuating mechanism of the dispensing device;

FIG. 10 is an enlarged fragmentary sectional view taken on line 10—10 of FIG. 9 illustrating the actuating piston in a forward position; and FIG. 11 is a similar view of FIG. 10 illustrating the actuating piston in a rearward position.

DESCRIPTION OF THE PREFERRED EMBODIMENT:

Referring now by reference numerals to the drawings and first to FIG. 1, it will be understood that the dispensing device, generally indicated by numeral 10, is of the type used to mix batter and the like by means of a mixing machine (not shown) commonly used in bakeries, and is attached to the underside of a mixing bowl 11. The mixing bowl 11 is supported in an operationally raised position as by a hydraulic jack generally indicated by numeral 12. The details of the dispensing device will now be described with initial reference to FIGS. 2 and 4.

As shown in FIG. 4 the mixing bowl 11 includes a depending spout fitting 13, which is provided at the bottom of said bowl and constitutes a discharge port. During the mixing process the spout 13 is closed by means of a removable plug 14 which is removed following attachment of the dispensing device 10 to the spout 13 as will be described later.

As shown in FIG. 2 the dispensing device 10 includes an elbow fitting 16 having a flange 17 which is connected to the corresponding flange 15 on the spout fitting 13. In the preferred embodiment, the fittings 13 and 16 are coupled together by means of a clamp 20, each of the flanges being grooved to suit an intermediate gasket generally indicated by numeral 18. The clamp 20, typically shown in FIG. 5, includes retainer sections 21, connected by a link 22 at one side and by an eyebolt 23 and wingnut 24 at the other side for rapid removal. A horizontal pipe fitting 25 having flanges 26 at each end is attached to the elbow fitting 16 by a similar clamp 20, and a forward pipe fitting 27, having a flange 28, is similarly clamped to the fitting 25. The forward fitting 27 terminates in a dispensing port which, in the preferred embodiment, is provided by a flanged insert 30 fixedly attached to the fitting 25 and having an aperture 31. As shown in FIG. 6, the flange 32 is provided with a pair of brackets 33 attached thereto as by fasteners 34, and apertured at 35 to receive a hinge pin 36 fixedly attached to a gate 37 and providing a pivotal mounting for said gate. The gate 37, which is provided with a resilient gasket 38, includes a forwardly bent upper portion 40. A spring 41 mounted on a pin 42 is disposed between said upper portion 40 and the flange 32 and biases the gate 37 into the closed position. The pin 42 is mounted within a passage 43 provided in the insert 30 and, under certain conditions, as will be described, operates to insure that the gate 37 is firmly closed.

The pipe fittings 25 and 27 provide a dispensing chamber which receives the bake mix, such as cake batter indicated by B from the mixing bowl 11. A plunger assembly, generally indicated by numeral 50, is mounted for longitudinal movement within said chamber wherein longitudinal movement of the plunger assembly 50 dispenses batter from the dispensing aperture 31. The plunger assembly 50 is moved forwardly and rearwardly by an actuating means directly connected to said plunger assembly 50 as will be described. The plunger assembly 50 includes a rod 51 having a plunger head 52 attached thereto as by a bolt 53. As best shown in FIG. 8 the plunger head 52 includes a plurality of apertures 54 and is provided with a valve element 55 having associated flexible vanes 56 covering each of said apertures 54. As shown in FIG. 2 the batter is discharged downwardly under gravity and fills the dispensing chamber up to the plunger head 52 which, in FIG. 2, is shown in a forward position. When the plunger assembly 50 is drawn rearwardly the vanes 56 flex forwardly to permit mix B to pass through the plunger head 52 to the forward side of said head. In FIG. 2 the rearward limit of the plunger head 52 is indicated in phantom outline. The mix disposed forwardly of the plunger head 52 is dispensed through the dispensing aperture 31 by forward movement of said plunger head. During this forward movement the vanes 56 are urged rearwardly against the head 52 to close the apertures 54. The gate 37 is opened, against the bias of the lightweight spring 41, by pressure of the batter and the gate remains in the open position until the pin 42 (FIG. 7) is engaged by the plunger head 52. Such engagement moves the pin 42 forwardly to engage the gate bent portion 40 resulting in the rotation of the gate 37 into a closure position in which the gasket 38 is compressed against the insert flange 32 to form a tight seal, which precludes leakage of the mix from the dispensing aperture 31 at the end of the plunger stroke. The actuating mechanism by which the plunger assembly 50 is moved longitudinally, forwardly and rearwardly within the dispensing chamber, will now be described.

In the preferred embodiment, the plunger assembly 50 is air actuated by means of a piston and cylinder assembly generally indicated by numeral 60. The cylinder is provided by a pipe fitting 61, having a flange 62 at one end, and a fixedly attached insert 63 at the other end provided with a flange 64. The fitting 61 is attached to an adaptor 65, which is welded or otherwise attached to the elbow fitting 15 at one end and includes a flange 66 at the other end, said flange having a compatible configuration with flange 64. Said flanges 64 and 66 are grooved to receive a gasket 67 and are connected by means of a clamp 70 which is similar to clamp 20 described above. The insert 63 and the adaptor 65 are apertured to slidingly receive the plunger rod 51. A piston head 72, having a collar 73 engageable with said insert 63, is fixedly attached to the other end of said plunger rod 51, said head having seals 74.

A mounting block 80 is attached to the remote end of the pipe fitting 61. Block 80 is provided with a flange 81 which is compatible with the flange 62 and is mounted to fitting 61 by means of a clamp 70. The mounting block 80 includes parallel passages 82 and 83 which receive a stop limit assembly, generally indicated by numeral 90, in sliding relation. The limit assembly 90 includes parallel tubular elements 91 and 92 having a fixedly attached stop element 93 having a seal 89 and being slidably mounted for longitudinal movement within the pipe fitting 61. The limit assembly as a whole is adjustably fixed in position by means of a vertical clamping screw 85, received in an internally threaded aperture 84 provided in the block 80, said screw being engageable with said tube 91. The actuating mechanism includes a valve block 94, which is fixedly attached to the outer end of limit assembly tube 91 and is provided with a handle 95 by which the tubes 91 and 92 may be slidably moved within associated passages 82 and 83 to adjust the position of the stop 93. It will be understood that the disposition of the stop 93, within the pipe fitting 61, determines the limit of travel of the piston head 72 within said fitting. In addition, because of the connection between the piston head 72 and the plunger head 52, it will be clear that the disposition of the stop 93 likewise determines the longitudinal stroke of said plunger head 52 and therefore determines the quantity of mix dispensed by said plunger head. In the preferred embodiment, the tube 91 is calibrated to provide a direct reading of the mix dispensed in terms of the cake size, eg eight ounces and twelve ounces, said calibrations being read, for example, against the rearward face of the mounting block 80 as indicated in FIG. 3. The piston 72 is moved forwardly and rearwardly within the sleeve 71 by means of air pressure, said movement being conditioned by a switching system which will now be described.

As best shown in FIGS. 10 and 11, the block 94 includes a passage 96, which receives the tube 91 in fixed relation, and a parallel passage 97, which is connected by an intermediate passage 98 to passage 96. Importantly, passage 97 mounts a valve element 100 in sliding relation. An air inlet passage 101 receives air from a supply line S and delivers air to said passage 97, which communicates with cylinder 61 at both sides of piston head 72, and air is routed to one side or the other depending on the location of the sliding valve element 100. As shown in FIGS. 10 and 11, passage 97 communicates with the left side of the piston head 72 via passages 98, 96 and tube 91. As shown in FIG. 2, passage 97 communicates to the right side of piston head 72 via downwardly inclined passage 102 and outlet 103, which are connected by a junction block 104 fixed to the valve block 94; telescopic tubular elements 105 and 106 having a seal 107 therebetween; a post 108 attached to insert 63 and having a passage 109 therein. The sliding valve element 100 includes end stops 110 and 111 and is grooved to mount sealing rings 112 and 113. A switching rod 114 is fixedly attached to one end of the element 100 and mounted for movement within the limit assembly tube 92, which is grooved to provide a seal 115 between said tube 92 and said switching rod 114. Air is routed from passage 97 to passage 102 depending on whether element 100 is to the right or the left.

Element 100 is moved to the right by means of an external switching linkage consisting of a link element 120, pivotally mounted to the valve block 94 by means of a bracket 121; and an elongate switching rod 122, slidably mounted to the post 108 and pivotally connected to the link 120 by pivot 123, and movement is accomplished as by striking the end of the switching rod 122 with a cake tin T. As shown by reference to FIGS. 10 and 11, said element 100 is moved to the left automatically, during rearward movement of the piston head 72, by engagement of said piston head with the switching rod 114.

Before describing the operating sequence in greater detail, the mixing bowl 11 and mounting jack 12 will be described.

The mixing bowl 11 is, in the preferred embodiment, a modified conventional mixing bowl of the type having a pair of lifting handles 128 and apertured lugs 129 by which the bowl is supported on a mixing machine (not shown).

The mixing bowl 11 is modified to provide an opening by removing a substantial part of the conventional domed portion shown in phantom outline in FIG. 3 and indicated by numeral 130. Following partial removal of the dome 130 the marginal material around the opening is formed downwardly and the pipe fitting 13 fixedly attached as by a ring of silver solder or the like shown by numeral 131. The removable plug 14 is shaped to a configuration substantially following the configuration of the original dome 130, said dome being provided in conventional bowls to ensure adequate mixing of the batter. As shown in FIG. 3, the plug includes a frusto-conical lower portion 132 having an internally threaded passage 133 for receiving a thumbscrew 135 to which an upper plug portion 134 is fixedly attached. Rotation of the thumbscrew 135 raises the upper portion 134 to the position shown in phantom outline and provides a handle by which the plug 14 may be removed after the dispensing device has been attached. A protective shroud 136 is fixedly attached to the bowl 11 to preclude damage to the pipe fitting 13, and a seal 137 on the plug 14 ensures a good fit in the fitting.

The jack 12 is provided with a yoke 140 having adjustable arms 141 which include a pin 142 received by the apertured mixing bowl lugs 129. The yoke 140 includes a pair of upright members 143 which are fixedly attached to a carriage 144 mounted to the jack post 145. In the embodiment shown the carriage 144 is raised by links 146 attached to the jack plunger mechanism 147 and the carriage 144, together with the yoke 140 is raised in the conventional manner by means of an arm 148. It will be understood that the jack 12 can be modified for hydraulic or air operation as desired.

It is thought that the structural features of this dispensing device have now become fully apparent from the foregoing description of parts and the installation and operation of the device will now be briefly described.

After the mixing of the batter B is completed the bowl 11 is mounted to the yoke 140 of the jack 12 and raised by the jack to a suitable elevation for dispensing purposes. The bowl plug thumb screw 135 is rotated to raise the plug handle portion 134. The dispensing device 10 is then connected to the bowl 11 by clamping the elbow fitting 15 to the discharge fitting 13 by means of a clamp 20. Following the attachment of the dispensing device 10 the plug 14 is removed manually to permit the batter to flow under gravity into the dispensing chamber formed by the horizontal fittings 25 and 27. At this point the structural arrangement of parts of the dispensing device is such that the plunger head 52 is in a forward position and the gate 37 is secured by engagement of the plunger head 52 with the pin 43. The limit assembly 90 is adjusted by loosening the clamp 85 and adjusting the position of the stop 93 within the sleeve 61 so that the travel of the piston 72 corresponds with the amount of mix to be deposited in the cake tin T.

The switching rod 122 is tapped by the cake T so that the link 120 moves the slide element 100 forwardly into the position shown in FIG. 10. In this position air is routed from the air inlet passage 101 to the inclined passage 102 by way of the portion of passage 97 disposed between the seals 112 and 113. Air is supplied to the outlet 103 leading to the rear of the piston head 72 via the telescopic elements 105 and 106 and passage 109 in the post 108. The piston head 72 is thereby moved rearwardly carrying the plunger head 52 with it. When the piston head 72 is moved to the left the air between the piston head 72 and the stop 93 is routed to atmosphere by way of tube 91 passages 96, 98 and 97, the stop 111 being cut away slightly to exhaust air from the rearward end of passage 97. As the plunger head 52 moves rearwardly to vanes 55 flex to admit batter through the plunger head 52 and into the forward portion of the dispensing chamber, between said head and the dispensing port 31. Just before the piston head 72 engages the stop 93 the remote end of the switching rod 114 is engaged by the piston head 72 and moves the valve element 100 automatically into a rearward position, clearly shown in FIG. 11. In this position air is routed from the air inlet 101 via passages 97 and 98 to passage 96 and from there by way of the tube 91, to the front of the piston head 72. Air pressure supplied to the front of the piston head 72 drives the piston head 72 and the plunger head 52 forwardly causing the batter ahead of said plunger, in the forward portion of the dispensing chamber, to be urged outwardly of the dispensing aperture 31 through the gate 37 and into the cake tin T. The relocation of the valve element 100 permits air between the piston head 72 and the insert 63 to be evacuated through orifice 103, telescopic line 105 and 106 and the inclined passage 102 and passage 97 to atmosphere, the valve element stop 110 being cut away slightly to permit air to exhaust from the end of the passage 97. As the plunger head 52 approaches the gate 37, the pin 42 is engaged and moved outwardly to engage the upper portion 40 of the gate 37 and thereby effectively seal the gate so that no leakage of the mix occurs at the end of the plunger stroke. The cycle of operations is thereby complete and the plunger will remain in the position shown in FIG. 2 until the switching rod 122 is again struck by the cake tin T.

In general, the components of the dispensing device 10 are of stainless steel or other suitable, sanitary material, and the fixed portions are attached to each other as by soldering or other suitable means. It will be readily understood that the elbow fitting 15, and the fittings 25 and 28 can be readily disassembled for cleaning by simply detaching the clamps 20. In addition, the actuating mechanism can be disassembled for cleaning by removing the two clamps 70 and removing the plunger head 52 from the rod 51, which will permit withdrawal of the piston and plunger assembly. The provision of the discharge fitting 13 on the mixing bowl 11 facilitates cleaning of this bowl. Following cleaning the plug 14 is reinserted and the bowl is in condition for the mixing operation.

In the preferred embodiment, because of the gravity assisted flow of the mix and the horizontal plunger, a very light pressure has proven adequate to dispense the mix in most instances.

I claim as my invention:

1. A dispensing device for dispensing a bakery mix from a mixing bowl having a discharge port, the device comprising:
   (a) a dispensing chamber disposed below the discharge port and including a dispensing port,
   (b) means connecting the discharge port and the dispensing chamber,
   (c) plunger means mounted in the dispensing chamber,
   (d) actuating means moving the plunger means in the dispensing chamber to operatively dispense mix from the dispensing port during a dispensing stroke, and
   (e) the actuating means including piston and cylinder means said piston being operatively connected to the plunger means, and means moving said piston and said plunger means toward and away from the dispensing port said means including valve means manually actuated to supply air to the cylinder to move the piston in one direction and actuated by operative engagement with the piston to supply air to the cylinder to move said piston in the other direction.

2. A dispensing device as defined in claim 1, in which:
   (f) the actuating means includes manually operated switching means and said valve means is provided by slide valve means having one end operatively engageable by said switching means and the other end operatively engageable by said piston for selectively routing pressurized air to either side of the piston.

3. A dispensing device as defined in claim 1, in which:
   (f) the actuating means includes adjustable limit means carrying the valve means and selectively predetermining the limit of travel of said piston within said cylinder.

4. A dispensing device as defined in claim 3, in which:
   (g) the limit means carrying the valve means includes a stop means slidingly mounted in the cylinder and operatively engageable by said piston, and means operatively adjusting and fixing the position of said stop means.

5. A dispensing device as defined in claim 3, in which:
   (g) the limit means includes calibrated means movable relative to the cylinder to provide visual indication of the predetermined limit of travel of said piston.

6. A dispensing device for dispensing a bakery mix from a mixing bowl having a discharge port, the device comprising:
   (a) a dispensing chamber disposed below the discharge port and including a dispensing port,
   (b) means connecting the discharge port and the dispensing chamber,
   (c) plunger means mounted in the dispensing chamber,
   (d) actuating means moving the plunger means in the dispensing chamber to operatively dispense mix from the dispensing port during a dispensing stroke,
   (e) the dispensing chamber being substantially horizontal and the dispensing port including gate means transversely disposed of said chamber,
   (f) the gage means being spring biased into a closed position, said bias being overcome by pressure from the plunger means through the medium of the mix when the plunger means moves toward said gate means during the dispensing stroke, and
   (g) said gate means including positive closing means operatively engageable by the plunger means at the end of the dispensing stroke to close the gate means independently of the spring bias.

7. A dispensing device for dispensing a bakery mix from a mixing bowl having a discharge port, the device comprising:
   (a) a dispensing chamber disposed below the discharge port and including a dispensing port having gate means,
   (b) means connecting the discharge port and the dispensing chamber,
   (c) plunger means mounted in the dispensing chamber,
   (d) actuating means moving the plunger means in the dispensing chamber to operatively dispense mix from the dispensing port during a dispensing stroke,
   (e) the gate means being biased into a closed position, said bias being overcome by pressure from the plunger means through the medium of the mix when the plunger means moves toward said gate means during the dispensing stroke, and
   (f) said gate means including positive closing means operatively engageable by the plunger means at the end of the dispensing stroke to close the gate means independently of the bias.

8. A dispensing device for dispensing a bakery mix from a mixing bowl having a discharge port, the device comprising:
   (a) a dispensing chamber disposed below the discharge port and including a dispensing port,
   (b) means connecting the discharge port and the dispensing chamber,
   (c) plunger means mounted in the dispensing chamber,
   (d) actuating means moving the plunger means in the dispensing chamber to operatively dispense mix from the dispensing port during a dispensing stroke, and
   (e) the actuating means including piston and cylinder means said piston being operatively connected to the plunger means, and means moving said piston and said plunger means toward and away from the dispensing port said means including valve means for supplying air to the cylinder to move the piston in either direction and including adjustable limit means connected to the valve means for movement therewith and slidingly and non-rotatively mounted in the cylinder for predetermining the limit of travel of said piston within said cylinder.

* * * * *